US00RE38100E

(19) United States
(12) Reissued Patent
Rentsch et al.

(10) Patent Number: US RE38,100 E
(45) Date of Reissued Patent: Apr. 29, 2003

(54) TACHOMETER BASED ON ELECTRICAL RIPPLE AND CALIBRATED BY MECHANICAL ENGINE SIGNALS

(75) Inventors: Wolfgang Rentsch, Pirna-Jessen (DE); Olaf Pohl, Pirna (DE)

(73) Assignee: Sun Electric Deutschland GmbH, Mettmann (DE)

(21) Appl. No.: 09/866,223

(22) Filed: May 29, 2001

Related U.S. Patent Documents

Reissue of:
(64) Patent No.: 5,640,086
Issued: Jun. 17, 1997
Appl. No.: 08/522,750
Filed: Sep. 1, 1995

(30) Foreign Application Priority Data

Sep. 6, 1994 (DE) ..... 44 31 720

(51) Int. Cl.[7] ..... G01P 3/48
(52) U.S. Cl. ..... 324/166; 324/161; 73/116; 73/117.2
(58) Field of Search ..... 324/160, 161, 324/163, 166, 202, 168, 169; 73/115, 116, 117.3, 117.2, 506; 123/687; 322/31; 340/679, 681; 307/120, 123

(56) References Cited

U.S. PATENT DOCUMENTS

| | | | |
|---|---|---|---|
| 3,603,878 | A | 9/1971 | Himmelstein |
| 3,765,233 | A | 10/1973 | Germann |
| 3,978,719 | A | 9/1976 | Hadden et al. |
| 4,152,580 | A | 5/1979 | LeBouder |
| 4,237,371 | A | 12/1980 | LeBouder |
| 4,263,578 | A | 4/1981 | Fukuhara et al. |
| 4,439,721 | A | 3/1984 | Mura |
| 5,004,979 | A | 4/1991 | Marino et al. |
| 5,087,881 | A | 2/1992 | Peacock |
| 5,216,881 | A | 6/1993 | Anlauf et al. |

FOREIGN PATENT DOCUMENTS

| | | |
|---|---|---|
| DE | 2648382 | 10/1976 |
| DE | 3942298 | 12/1989 |
| DE | 4036713 | 11/1990 |
| EP | 188403 | 1/1986 |
| EP | 287852 | 3/1988 |
| EP | 408877 | 7/1991 |
| EP | 472877 | 7/1991 |
| FR | 2337886 | 1/1976 |
| GB | 1539395 | 4/1976 |
| GB | 2174499 | 11/1986 |
| JP | 5322482 | 1/1978 |
| JP | 1241667 | 10/1986 |

*Primary Examiner*—Jay Patidar
(74) *Attorney, Agent, or Firm*—Seyfarth Shaw

(57) ABSTRACT

The tachometer includes a microphone for disposition next to the exhaust of the vehicle and an accelerometer for disposition adjacent to its engine. A selected one of the outputs is connected to an ADC which provides digital samples to a central processing unit. Also, the ripple from the battery is sampled and provided to the CPU. The CPU calculates a constant representing the relationship of the frequencies of the ripple samples and the mechanical samples and responds to the ripple samples and the constant to provide output signals corresponding to the speed of the engine. The speed is displayed.

30 Claims, 3 Drawing Sheets

TACHOMETER BASED ON ELECTRICAL RIPPLE AND CALIBRATED BY MECHANICAL ENGINE SIGNALS

Matter enclosed in heavy brackets [ ] appears in the original patent but forms no part of this reissue specification; matter printed in italics indicates the additions made by reissue.

BACKGROUND OF THE INVENTION

An alternator which charges the battery in a vehicle causes a ripple to be superimposed on the DC battery voltage, the frequency of which ripple is related to the engine speed. There are prior-art tachometers that calculate engine speed by measuring the frequency of the ripple. To convert ripple frequency to RPM requires knowledge of the relationship between such frequency and the rotational speed of mechanical parts of the engine. For example, it is known that the alternator speed is approximately one to three times the speed of the crank shaft. However, to obtain precise RPM readings the exact relationship in a particular vehicle must be determined. Prior-art approaches to calibration have not been sufficiently accurate.

Also known are tachometers that calculate RPM based on mechanical oscillations in the engine. For example, it is known to measure the frequency of the exhaust. As each cylinder fires, a pulse is produced in the exhaust. Measurement of the frequency of these pulses yields information on the engine speed. In such a tachometer, a microphone is placed near the exhaust pipe. The microphone picks up the exhaust sounds and the tachometer uses the frequency of those sounds to calculate RPM. A second type of mechanical oscillation is vibration of the engine. An accelerometer is placed near or on the engine to measure the frequency of such vibration, which frequency is related to engine speed.

At low engine speed, true RPM is very accurately related to the frequency of mechanical oscillations. But, the higher the engine speed, the lower the accuracy.

It has become important to provide virtually instantaneous measurement of the engine speed. This is because government specifications in various countries require measurement of certain parameters as a function of engine speed. For example, in Germany, there are specifications for the opacity of engine emissions in the range of 1,000 RPM to 10,000 RPM. Currently available tachometers do not have the capability of instantaneously keeping track of such extreme variations in engine speed.

SUMMARY OF THE INVENTION

It is, therefore, an important object of the present invention to provide a tachometer which accurately displays engine speed even though it is changing very rapidly.

Another object is to provide a tachometer that calculates engine speed based on the ripple in the vehicle's electrical system, and uses mechanical oscillation of the engine for calibration.

Another object is to provide a tachometer that calculates engine speed based on the ripple in the vehicle's electrical system, and uses exhaust sound frequency of the engine for calibration.

In summary, there is provided a tachometer for determining the speed of the engine in a vehicle that includes a battery-operated electrical system which produces a DC voltage having a ripple thereon, the engine producing mechanical oscillations during operation, the tachometer comprising first means for coupling to the electrical system for providing first signals representative of the frequency of the ripple, second means for coupling to the engine for providing second signals representative of the frequency of the mechanical oscillations, third means coupled to the first and second means for calculating a constant representing the relationship of the frequencies of the first and second signals and for responding to the first signals and the constant to provide third electrical signals corresponding to the speed of the engine.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENT

Figure 1:
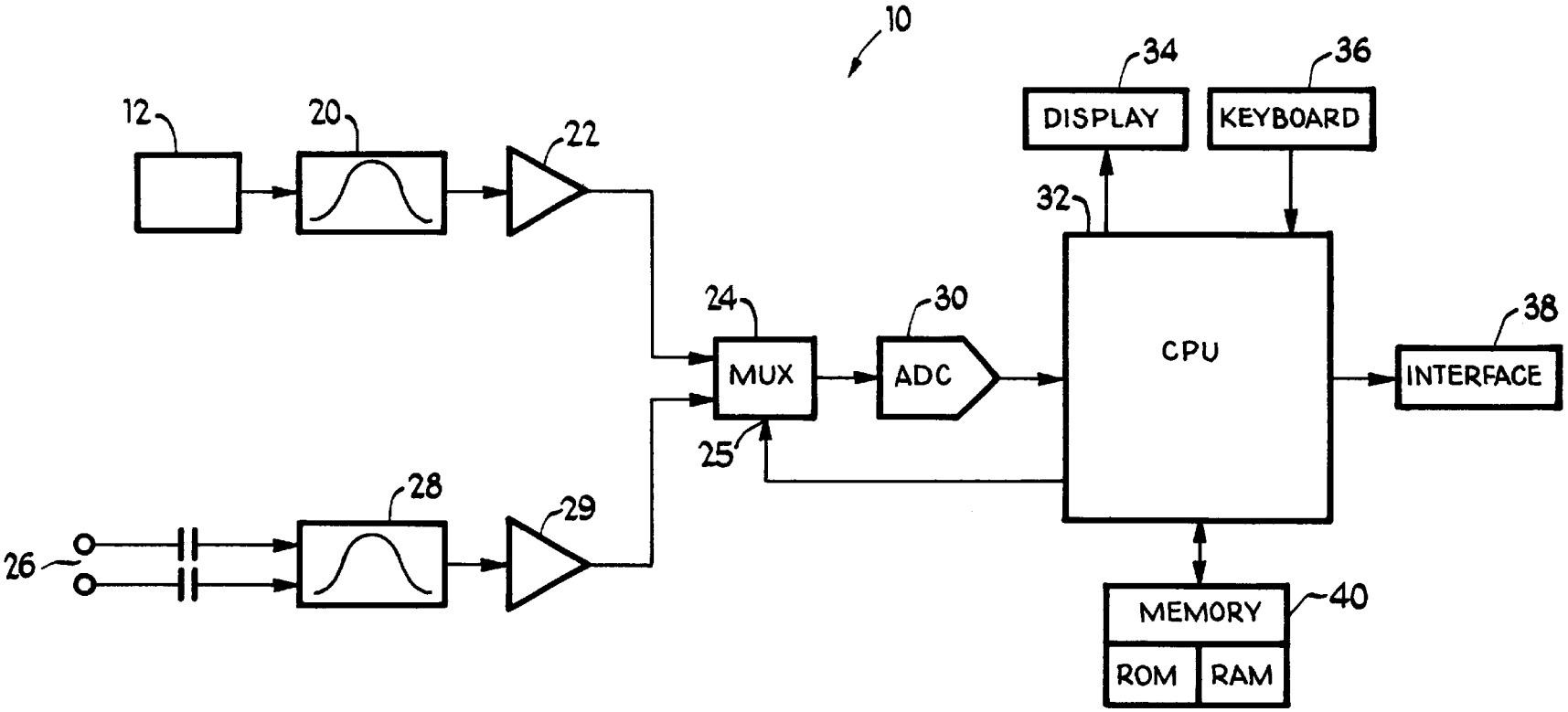
FIG. 1 is a block diagram schematically depicting the tachometer.

Turning now to FIG. 1, there is depicted a schematic diagram of a tachometer 10 incorporating the features of the present invention. Tachometer 10 includes a microphone 12 arranged to pick up the sound emanations from the exhaust of a vehicle. The microphone is specifically adapted to be placed near the exhaust pipe. The sensitivity of the microphone allows it to be placed up to several meters from the exhaust pipe depending on the power of exhaust sound. Microphone 12 could be an accelerometer adapted to be placed in contact with the vehicle's engine block and sense vibrations in the engine. In an operative embodiment of the invention, microphone 12 was built into the housing (not shown) containing tachometer 10. An accelerometer could be at the end of a cable connectable to a jack on the housing. The exhaust, on the one hand, and the vibrations of the engine, on the other hand, may be said to represent mechanical oscillations of the engine. Microphone 12 is, of course, a transducer which produces electrical signals corresponding respectively to the exhaust (or to the vibrations). The pulsations in the exhaust correspond to combustion of the various cylinders in the engine and, thus, are directly related to engine speed. Similarly, combustion in each cylinder causes the engine to vibrate and, thus, the electrical signals from an accelerometer are also directly related to the engine speed. Either output could be used depending upon the circumstances.

If desired, a microphone 12 and an accelerometer could be employed and respectively connected to the dual inputs of a multiplexer (not shown). Control signals applied to the input of such multiplexer establish whether the microphone signals or the vibration signals are to be processed. The technician may want to check the outputs from both microphone 12 and the accelerometer and use the one that provides the "best" signals. A bandpass filter 20 is designed to eliminate frequencies clearly outside the range of the exhaust signal (or the vibration signal). In an operative embodiment, filter 20 had a bandpass of 5 Hz to 150 Hz. The signal from filter 20 is referred to as the "mechanical signal." The signal is amplified in amplifier 22 and applied as one input of a multiplexer 24. The elements 12–22 are in a first channel of tachometer 10.

A second channel has its input connected to the electrical system 26 of the vehicle, for example, the battery terminals or the cigarette lighter receptacle. The battery voltage is, of course, DC, but, because it is charged by the alternator and the alternator is operated by rotation of the engine, a ripple is present on the DC voltage, the frequency of which ripple is proportional to engine speed. A bandpass filter 28 is designed to eliminate frequencies clearly outside the range of the ripple signal. In a specific example, the bandpass of filter 28 was 500 Hz to 10,000 Hz. The signal is amplified in amplifier 29 and applied as a second input to multiplexer 24.

Multiplexer 24 is controlled by signals at its control input 25. The analog signal out of multiplexer 24 is converted to digital samples by an analog-to-digital converter 30. ADC 30 generates digital samples corresponding to the amplitude of the analog signal from microphone 12 (or an accelerometer) or electrical system 26, depending upon which is connected at a particular moment in time. The output of ADC 30 is applied to a central processing unit 32. Associated with CPU 32 is a display 34 on which appears RPM readings and prompts for operating tachometer 10. Also, associated with CPU 32 is a keyboard 36. In an operative embodiment, keyboard 36 was a set of four keys (not shown) on the housing containing the tachometer: a general key, an up key, a down key and a calibrating key. An interface 38 is for connecting CPU 32 to peripherals, such as a printer or engine analyzer. In an operative embodiment, interface 38 was a conductor which was adapted to have applied thereto an inductive probe connected to an engine analyzer. Alternatively, and/or in addition, interface 38 may be a serial port such as an RS232. Finally, CPU 32 has associated with it memory 40 in the form of ROM and RAM.

The ripple on the DC voltage has a frequency directly related to the engine speed. In normal operation, tachometer 10 will be used to display RPM by calculating the frequency of the ripple. The signal provided by the first channel (elements 12–22) is used to calculate K, a constant or factor by which the ripple frequency must be multiplied to provide RPM. This calculation is performed by CPU 32.

At idle, the exhaust frequency very accurately represents the engine speed, but at higher engine speeds, the relationship between the exhaust frequency and engine speed becomes less and less accurate. Thus, K is preferably calculated at idle.

Figure 2:
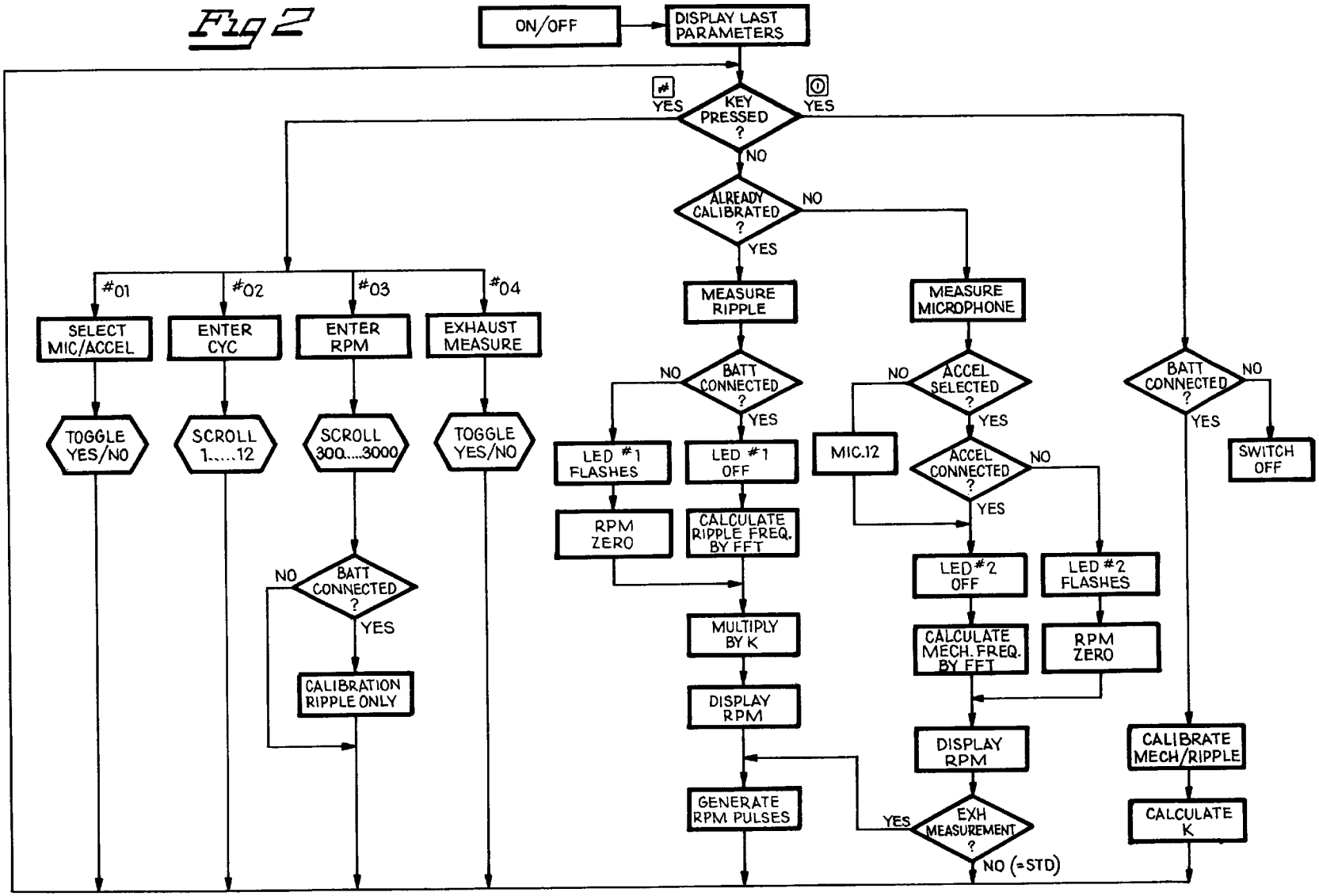
FIG. 2 is a flow chart of the computer program in the microprocessor of FIG. 1.

FIG. 2 depicts a flow chart of the program in CPU 32. The tachometer is turned on and connected to the battery via the cigarette lighter receptacle, for example. Displayed will be the previous parameters. There will appear on display 34, the prompt "select mic/acc," whereupon the technician operates the up or down key to select either microphone 12 (or an accelerometer). Then, the prompt "enter cylinder" appears on display 34 and the up or down key is used to scroll through the numbers "1" to "12", and the technician selects one such number.

Then, the "enter RPM" prompt appears, and the up/down keys are used to scroll through the range of 300 to 3,000 RPM. This is an alternative way to calibrate, when engine speed is measured by an independent meter. The software inquires as to whether the tachometer is plugged in. If it is, the ripple is calibrated. Then "exhaust measurement" prompt appears on display 34 and using the up/down keys the technician responds using the "up/down" keys if he wants to measure RPM based on exhaust only.

Having gone through the prompts, the technician next calibrates the tachometer. The technician will bring the tachometer near the exhaust if he plans to use microphone 12 (or he will attach an accelerometer). The technician depresses the calibrating key (not shown), which is signified by a vertical line in a circle. Inquiry is made as to whether tachometer 10 is plugged in. If not, the tachometer is turned off. If it is, then the calibration subroutine commences.

Figure 3:
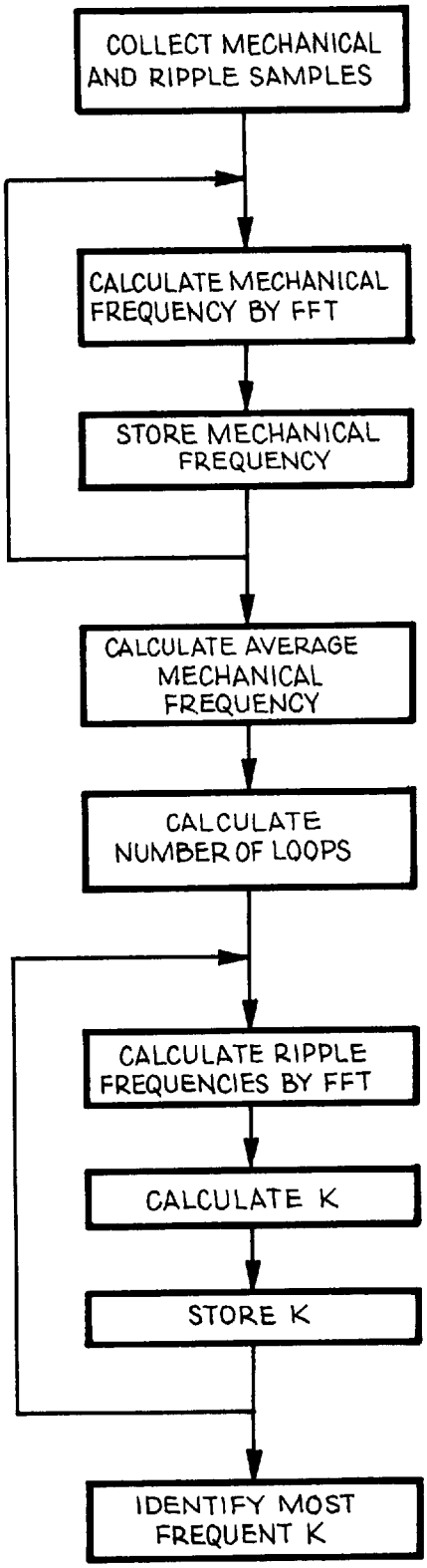
FIG. 3 is a flow chart of the calibration subroutine in the program.

Referring to FIG. 3, a predetermined number of mechanical samples (from ADC 30) is collected, "mechanical" corresponding to signals from microphone 12 (or the accelerometer, depending upon which is connected). Also, a predetermined number of ripple samples is collected corresponding to signals from electrical system 26. In an operative embodiment, 256 mechanical samples and 10,000 ripple samples were collected simultaneously. In that embodiment, the mechanical sampling rate was 240 Hz and the ripple sampling rate was 12 KHz. In an operative embodiment, the collection procedure took about 2 seconds.

Figure 4:
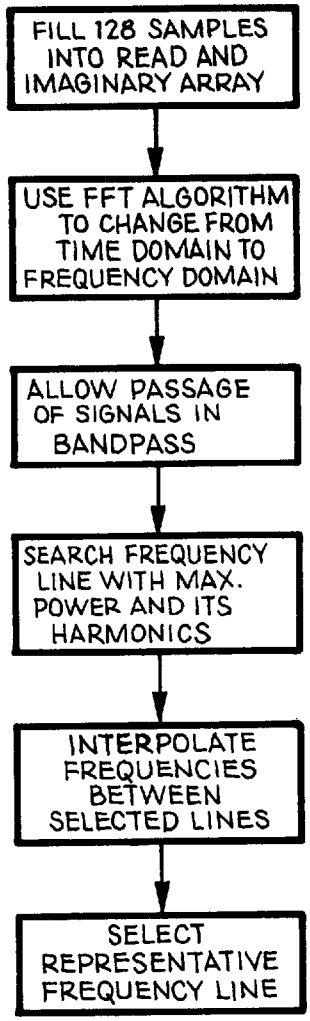
FIG. 4 is a flow chart of the fast Fourier transformation subroutines in the program.

The frequency of the mechanical samples is calculated by a highly accurate mathematical system called Fast Fourier Transformations ("FFT"). The FFT subroutine is shown in FIG. 4. The electrical signals derived from microphone 12 and electrical system 26 are complex and have numerous frequency components in a very broad range of several thousand Hz. FFT is used in tachometer 10 to quickly evaluate these signals and determine the primary frequency. It is because tachometer 10 uses FFT that it has the capability of instantaneously (within 0.1 second) keeping track of extreme variations in engine speed. FFT enables movement from the time domain to the frequency domain and to evaluate peaks of the signals in the frequency domain.

The mechanical frequency is stored. The procedure of calculating the mechanical frequency and storing it is repeated a predetermined number of times, such as 128. Each of the 128 loops uses a predetermined number of mechanical samples from the total of 256 samples. In a particular embodiment, the first loop included samples 1–128, the next loop included samples 2–129 and so forth, and loop 128 included samples 129 to 256. As a result, 128 frequencies were stored. The average mechanical frequency was calculated by adding up the stored frequencies and dividing by 128.

N is then calculated. N is needed in order to suppress frequency modulation of the ripple frequency. In an operative environment, N was a whole number, in the range of 108 to 128. The frequency of the ripple samples is calculated by the FFT subroutine of FIG. 4. A constant is calculated by dividing the actual mechanical frequency that was previously calculated and stored by the ripple frequency just calculated. That constant is stored. The procedure of calculating the constant and storing it is repeated N times.

Each of the N loops uses a predetermined number of ripple samples from the total of 10,000 samples. In a particular embodiment, the first loop included samples 1–128, the next loop included samples 51–178 and so forth, the sampling rate being 50 times higher. As a result, the constant is calculated N times and stored. In the final block in the subroutine of FIG. 3, the one of the constants that appears most often becomes the constant K.

Returning to FIG. 2, with the calibration completed, no key is depressed. Also, the answer to whether the tachometer is "already calibrated" is "yes." In the "measure ripple" block, the signal processing is initiated. If the tachometer is not plugged in, an LED #1 (not shown) flashes and the RPM reading on display 34 is "0." If the tachometer is plugged in, LED #1 is off and the frequency of the ripple samples is calculated using the FFT subroutine of FIG. 4. The engine speed is calculated by multiplying the ripple frequency by K. The RPM appears on display 34. RPM pulses are generated for use in a peripheral such as a printer or engine analyzer.

If the tachometer has not been calibrated, the displayed engine speed is automatically not based on ripple, but, rather on the one of the mechanical devices that is used, either microphone 12 or an accelerometer. In the "measure microphone" block, the signal processing is initiated. Thus, if the calibrating key has not been depressed the answer to "already calibrated"? will be "no." If microphone 12 was selected, the answer to "accel selected?" will be "no" causing an output from the mic 12 "on" block. An LED #2 will be off and the frequency of the mechanical samples from microphone 12 will be calculated using the FFT subroutine of FIG. 4. If the accelerometer is selected, the answer to "accel selected?" will be "yes." If the accelerometer is connected, by means of a cable, then LED #2 is off and the frequency of the mechanical pulses as derived from the accelerometer is calculated. In either case, engine speed based on mechanical samples is displayed. If the accelerometer is not connected, then LED #2 will flash and the RPM reading will be zero.

What has been described, therefore, is an improved tachometer that determines engine speed by measuring the frequency of the ripple on the battery and multiplying that frequency by a constant determined by a device that measures the frequency of the exhaust or vibrations of the engine. While the preferred embodiment of the invention has been described, it is to be understood that the scope of the protection is not to be limited by such embodiment, but rather by the following claims.

What is claimed is:

1. A tachometer for determining the speed of the engine in a vehicle that includes a battery-operated electrical system which produces a DC voltage having a ripple thereon, the engine producing mechanical oscillations during operation, the tachometer comprising:

a first input circuit for coupling to the electrical system for providing first signals representative of the frequency of the ripple, a second input circuit for coupling to the engine for providing second signals representative of the frequency of the mechanical oscillations, and a processing circuit coupled to said first and second input circuits and operating under stored program control [for calculating a constant representing the relationship of the frequencies of the first and second signals and for responding to said first signals and the constant to provide third signals corresponding to the speed of the engine] (*a*) *to collect simultaneously a first predetermined number of ripple samples from the first signal and a second predetermined number of mechanical samples from the second signal,* (*b*) *to calculate the frequency of the mechanical samples to provide a mechanical frequency,* (*c*) *to store the mechanical frequency,* (*d*) *to repeat the previous two steps a third predetermined number of times,* (*e*) *to provide a representative mechanical frequency from the stored mechanical frequencies,* (*f*) *to calculate the frequency of the ripple samples,* (*g*) *to calculate the ratio of the representative mechanical frequency to the ripple sample frequency,* (*h*) *to store such ratio,* (*i*) *to repeat the three previous steps a fourth predetermined number of times, and* (*j*) *to identify a representative ratio which becomes a constant, and* (*k*) *to provide third signals corresponding to the speed of the engine as a function of the constant and the frequency of the ripple.*

2. The tachometer of claim 1, wherein said constant is calculated while the engine is idling.

3. The tachometer of claim 1, wherein said second input circuit includes a microphone for disposition next to the exhaust of the vehicle.

4. The tachometer of claim 1, wherein said processing circuit includes a multiplexer coupled to said first and second [means] *input circuits*.

5. The tachometer of claim 1, wherein said first input circuit includes a bandpass filter.

6. The tachometer of claim 5, wherein the bandpass of said bandpass filter is about 500 to 10,000 Hz.

7. The tachometer of claim 6, wherein said second input circuit includes a bandpass filter.

8. The tachometer of claim 7, wherein the bandpass of said bandpass filter is about 5 to 150 Hz.

9. The tachometer of claim 1, and further comprising a display coupled to said processing circuit to display the speed of the engine.

[10. A tachometer for determining the speed of the engine in a vehicle that includes a battery-operated electrical system which produces a DC voltage having a ripple thereon, the engine producing mechanical oscillations during operation, the tachometer comprising: a first input circuit for coupling to the electrical system for providing first signals representative of the frequency of the ripple, a second input circuit for coupling to the engine for providing second signals representative of the frequency of the mechanical oscillations, an analog-to-digital converter coupled to said first and second means to provide ripple samples in response to the first signals and mechanical samples in response to the second signals, and a central processing unit coupled to said analog-to-digital converter and operating under stored program control for calculating a constant representing the relationship of the frequencies of the ripple samples and the mechanical samples and for responding to said ripple samples and the constant to provide output signals corresponding to the speed of the engine.]

11. The tachometer of claim [10] *1*, wherein said [central] processing [unit] *circuit* determines the frequencies of said ripple samples and said mechanical samples by Fast Fourier Transformation.

[12. The tachometer of claim 10, wherein said central processing unit is programmed: to collect simultaneously a first predetermined number of ripple samples and a second predetermined number of mechanical samples, to calculate the frequency of the mechanical samples to provide a mechanical frequency, to store the mechanical frequency, to repeat the previous two steps a third predetermined number of times, to provide a representative mechanical frequency, to calculate the frequency of the ripple samples, to calculate the ratio of the representative mechanical frequency to the ripple sample frequency, to store each such ratio, to repeat the previous two steps a fourth predetermined number of times and to identify a representative ratio which becomes said constant.]

13. The tachometer of claim [12] *1*, wherein the steps of calculating the mechanical sample frequency and the ripple sample frequency are by Fast Fourier Transformation.

14. The tachometer of claim [12] *1*, wherein the first predetermined number is 10,000, the second predetermined number is 256, the third predetermined number is 128 and the fourth predetermined number is between 108 and 128.

15. The tachometer of claim [12] *1*, wherein the representative mechanical frequency is the average of the mechanical frequencies.

16. The tachometer of claim [12] *1*, wherein the representative ratio is the most frequently appearing of the ratios.

17. The tachometer of claim [10] *1,* and further comprising a keyboard to supply information to the central processing unit.

[18. The tachometer of claim 10 and further comprising a display coupled to said central processing unit to display the speed of the engine.]

19. A tachometer for determining the speed of the engine in a vehicle that includes a battery-operated electrical system which produces a DC voltage having a ripple thereon, the engine producing mechanical oscillations during operation, the tachometer comprising:

a first input circuit for coupling to the electrical system for providing first signals representative of the frequency of the ripple;

a second input circuit for coupling to the engine for providing second signals representative of the frequency of the mechanical oscillations; and a central processing unit coupled to said input circuits and operating under stored program control for (a) calculating the frequency of the ripple, (b) calculating the frequency of the mechanical oscillations to provide a mechanical frequency and storing the calculated mechanical frequency and repeating this calculation and storage step a predetermined number of times, (c) averaging the calculated and stored mechanical frequencies to provide a representative mechanical frequency, (d) calculating a constant representing the relationship of the frequency of the ripple and the representative mechanical frequency, and (e) responding to the constant and the frequency of the ripple to provide output signals corresponding to the speed of the engine.

20. A tachometer for determining the speed of the engine in a vehicle that includes a battery-operated electrical system which produces a DC voltage having a ripple thereon, the engine producing mechanical oscillations during operation, the tachometer comprising:

a first input circuit for coupling to the electrical system for providing first signals representative of the frequency of the ripple;

a second input circuit for coupling to the engine for providing second signals representative of the frequency of the mechanical oscillations; and a central processing unit coupled to said input circuits and operating under stored program control for (a) calculating the frequency of the ripple, (b) calculating the frequency of the mechanical oscillations to provide a mechanical frequency, (c) calculating the ratio of the mechanical frequency to the frequency of the ripple and storing the ratio and repeating this calculation and storage step a predetermined number of times to identify a representative ratio which becomes a constant, and (d) responding to the constant and the frequency of the ripple to provide output signals corresponding to the speed of the engine.

*21. The tachometer of claim 19, wherein the constant is calculated while the engine is idling.*

*22. The tachometer of claim 19, wherein the second input circuit includes a microphone for disposition next to the exhaust of the vehicle.*

*23. The tachometer of claim 19, wherein the processing unit includes a multiplexer coupled to the first and second input circuits.*

*24. The tachometer of claim 19, wherein each of the first and second input circuits includes a bandpass filter.*

*25. The tachometer of claim 19, and further comprising a display coupled to the processing unit to display the speed of the engine.*

*26. The tachometer of claim 19, wherein the central processing unit calculates the frequency of the ripple and the frequency of the mechanical oscillations by Fast Fourier Transformation.*

*27. The tachometer of claim 20, wherein the constant is calculated while the engine is idling.*

*28. The tachometer of claim 20, wherein the second input circuit includes a microphone for disposition next to the exhaust of the vehicle.*

*29. The tachometer of claim 20, wherein the processing unit includes a multiplexer coupled to the first and second input circuits.*

*30. The tachometer of claim 20, wherein each of the first and second input circuits includes a bandpass filter.*

*31. The tachometer of claim 20, and further comprising a display coupled to the processing unit to display the speed of the engine.*

*32. The tachometer of claim 20, wherein the central processing unit calculates the frequency of the ripple and the frequency of the mechanical oscillations by Fast Fourier Transformation.*

*33. The tachometer of claim 20, and further comprising a keyboard to supply information to the central processing unit.*

* * * * *